United States Patent [19]

Ochiai et al.

[11] Patent Number: 5,531,521
[45] Date of Patent: Jul. 2, 1996

[54] LINEAR ROLLING GUIDE UNIT

[75] Inventors: Isao Ochiai; Osamu Satou, both of Seki, Japan

[73] Assignee: Nippon Thompson Co., Ltd., Tokyo, Japan

[21] Appl. No.: 395,103

[22] Filed: Feb. 27, 1995

[30] Foreign Application Priority Data

Mar. 4, 1994 [JP] Japan .................................. 6-058301

[51] Int. Cl.$^6$ ................................................. F16C 29/06
[52] U.S. Cl. ................................................. 384/15; 384/45
[58] Field of Search ................................ 384/15, 45, 44, 384/43; 464/168

[56] References Cited

U.S. PATENT DOCUMENTS

| 5,087,130 | 2/1992 | Tsukada | 384/15 |
| 5,139,347 | 8/1992 | Hattori | 384/15 |
| 5,374,126 | 12/1994 | Akasako et al. | 384/45 |
| 5,388,912 | 2/1995 | Agari | 384/45 |

FOREIGN PATENT DOCUMENTS

| 57-38812 | 8/1982 | Japan . |
| 62-43136 | 11/1987 | Japan . |

Primary Examiner—Lenard A. Footland
Attorney, Agent, or Firm—Browdy and Neimark

[57] ABSTRACT

The under seal of this linear rolling guide unit comprises a pair of L-shaped under seal members that are bent and engaged together. The under seal members can be positioned relative to each other by engaging the engagement projections and the engagement recesses. Because the under seal members can be moved relative to each other in the longitudinal direction, if there are dimensional errors in the overall length of the slider in the longitudinal direction, they can be offset by adjusting the overall length of the under seal. In this way, the elongation and contraction due to thermal expansion and external forces are accommodated. The under seal is secured to the end surfaces of the end caps, not the underside of the slider, so that even when the dimension $H_1$ between the base on which the track rail is installed and the slider's underside is small, the under seal can be easily and firmly fixed.

7 Claims, 4 Drawing Sheets

LINEAR ROLLING GUIDE UNIT

BACKGROUND OF THE INVENTION

1. Field of the Invention

The present invention relates to a linear rolling guide unit, in which a slider comprising a casing, end caps, an under seal and end seals is slidably mounted on a track rail through rolling elements.

2. Description of the Prior Art

An example of known linear rolling guide unit is shown in FIG. 10. The linear rolling guide unit, as shown in FIG. 10, comprises: a track rail 1 having raceway grooves 9 formed on both longitudinal sidewall surfaces 11 thereof; and a slider 30 slidably mounted astride the track rail 1. The slider 30 comprises: a casing 2 which is slidable relative to the track rail 1 and has raceway grooves 8 at positions facing the raceway grooves 9; rolling elements 4 rolling between the opposing raceway grooves 8 and 9 to allow their relative motion; and end caps 5 mounted to the longitudinal ends of the casing 2, the longitudinal direction being the sliding direction of the casing 2.

The end cap 5 has an end seal 6 that provides the longitudinal sealing between the track rail 1 and the slider 30. The end cap 5 is also provided with a grease nipple 18 for supplying lubricant to the sliding surfaces between the track rail 1 and the slider 30. To prevent the rolling elements 4 from coming off the casing 2, retainer bands 17 are provided to the casing 2 in such a way as to enclose these balls 4. To provide vertical sealing for a sliding portion between the casing 2 and end caps 5 and the longitudinal sidewall surfaces 11 of the track rail 1, under seals 31 are attached to the undersides of the end caps 5 and the casing 2.

The slider 30 is mounted astride the track rail 1 and freely slides along the track rail 1 through the rolling elements 4—balls that circulate along the raceway grooves 9 in the track rail 1. That is, the rolling elements 4 that travel loaded along the raceway grooves 9 of the track rail 1 are led to direction changing passages (not shown) formed in the end caps 5 and further to return passages 10 formed in the upper part of the casing 2 parallel to the raceway grooves 8. In this way, the slider 30 is allowed to slide relative to the track rail 1 by the rolling elements 4 traveling loaded between the raceway grooves 8 on the slider 30 and the raceway grooves 9 on the track rail 1.

Another example of the conventional linear rolling guide unit is shown in FIG. 11. FIG. 11 is a partly cutaway end view of the linear rolling guide unit. The linear rolling guide unit has a slider 32 mounted slidable on the track rail 1 and thus is provided with a sealing device at a sliding portion between the slider 32 and the track rail 1 to prevent leakage of lubricant and entrance of foreign matter from outside. The sealing device includes end seals 6 attached to the ends of the end caps 5 to provide longitudinal sealing and under seals 33 attached to the undersides of the casing 2 and the end caps 5 to provide vertical sealing.

An example of the conventional sealing device comprises a pair of end seals 6 provided one to each end cap 5 and a pair of under seals 31, 33 on both sides of the track rail 1, that is, two end seals 6 and two under seals 31, 33, a total of four components (this is referred to as a sealing device A; disclosed, for example, in Japan Patent Publication No. 38812/1982). In the sealing device A in general, the under seals 31, 33 are secured to the underside of the casing 2 or end caps 5 by fastening means such as screws and bolts.

The linear rolling guide unit applied to miniature linear way, however, has a drawback that because of the small size of the unit, the distance H between a base 27 on which the track rail 1 is installed and the underside 28 of the slider 32, i.e., dimension $H_1$ (see FIG. 11), becomes very small making it difficult to use fastenings such as screws, which assure reliable fixing, in mounting the under seals 33 to the underside of the casing 2 or end caps 5. The only way to fix the under seals 33 is by bonding. Further, because the sealing device A consists of four components, the number of assembly processes becomes necessarily large increasing costs. Another disadvantage is that the sealing performance of a contact portion between the end seal and the under seal is not good enough.

Another example of the conventional sealing device has a pair of end seals and a pair of under seals formed in an integral structure, as shown in FIG. 12 (this is referred to as a sealing device B; disclosed, for example, in Japan Utility Model Publication No. 43136/1987). The sealing device B is fabricated by punching from a metal plate a core member having a pair of end plates 12 and a pair of bottom plates 13, and by bending the core member and fixing a seal member of elastic material such as plastics to the core member to form in an integral structure the end plates 12 serving as the end seals and the bottom plates 13 serving as the under seals. The end plates 12 each have a virtually U-shaped opening 7, to which is secured a seal member whose shape conforms to the external shape of the track rail 1. The bottom plates 13 are secured at their upper surface with a seal member whose cross section is a diamond. The end plates 12 are formed with mounting holes 14, through which screws are passed in fixing the sealing device B to the end caps 5. The distance between the paired end plates 12 is set equal to the overall longitudinal length of the casing 2 with the end caps 5 attached.

The sealing device B has a construction in which the end plates 12 are fixed to the end caps 5 by screws, in other words, they are not fixed to the underside of the casing 2 or end caps 5, so that even when the distance H (dimension $H_1$) between the base on which the track rail 1 is mounted and the slider's bottom face is very small, the sealing device B can be secured to the end caps 5 by screws. In this sense, the sealing device B solves the problem experienced with the sealing device A. The sealing device B, however, has a drawback of being unable to accommodate variations in the overall length of the casing 2 and two end caps 5, i.e., dimensional errors, because the distance between the end plates 12 is constant.

Further, as mentioned above, because the sealing device B has its under seals and the end seals formed integral through workings, including punching and bending of the end plates 12 and bottom plates 13 and through fixing of sealing member to these plates, it is significantly difficult to fabricate the sealing device B with so high a precision that when assembled onto the slider, the under seals and the end seals have good sealing performance. Hence, high level of sealing performance may not be achieved. Furthermore, when it sustains even a partial damage, the sealing device B has to be replaced entirely, raising costs.

SUMMARY OF THE INVENTION

An object of this invention is to solve the above-mentioned problems and to provide a linear rolling guide unit, which allows simple, reliable fixing of the under seals to the slider by screws or rivets even when the distance between the base on which the track rail is mounted and the slider's underside is small. It is another object to provide a linear rolling guide unit, in which the length of an under seal can be adjusted according to the longitudinal length of the casing and end caps without degrading the sealing performance of the under seal. The linear rolling guide unit according to this invention comprises:

- a track rail having raceway grooves formed on longitudinally extending side wall surfaces thereof;
- a casing slidable relative to the track rail and having raceway grooves formed at positions facing the first raceway grooves on the track rail;
- a pair of end caps mounted to the longitudinal ends of the casing;
- rolling elements circulating between the facing raceway grooves; and
- end seals attached to outer end surfaces of the end caps;
- an under seal mounted astride the track rail to seal the casing, the end caps and the track rail;
- wherein the under seal comprises a pair of bottom portions arranged on the undersides of the casing and the end caps on both sides of the track rail, and a pair of facing end portions bent integrally from the ends of the bottom portions and fixed to the outer end surfaces of the end caps.

The under seal comprises bottom portions arranged on the undersides of the casing and the end caps and end portions formed integral with the bottom portions. Because the end portions are secured to the outer end surfaces of the end caps, even when the distance or dimension $H_1$ between the base on which the track rail is installed and the underside of the slider made up of the casing and end caps is small, the under seal can be easily and firmly fixed by fastening means such as screws.

The under seal is made from a metal material and is formed by punching a steel plate into L-shaped under seal members. By making an appropriate arrangement of the under seal members when punching the steel plate, it is possible to save the material when compared with a conventional rectangular ring sealing device.

Alternatively, the under seal comprises a core member of a metal material forming the bottom portions and the end portions and a seal member of an elastic material secured to that part of the bottom portions of the core member on the track rail side.

Or, the under seal is made from an elastic material such as oil resistant rubber and plastics. The under seal is a rectangular ring member consisting of a pair of end portions and a pair of bottom portions. Because the under seal itself is elastic, dimensional errors of the overall length of the slider in the longitudinal direction can be offset by the under seal.

The sealing device in this linear rolling guide unit comprises three components: an under seal made up of a first under seal member and a second under seal member formed integral with each other and two end seals. This arrangement (three components) requires fewer parts than the conventional arrangement (four components), reducing the number of processes of assembling the sealing device onto the slider. At the same time, the machining precision can be improved over the conventional structure in which the under seal and the end seals are integrally formed. The sealing performance therefore is improved.

Alternatively, the under seal is formed in the following way. Two L-shaped under seal members—first and second under seal members—are formed, each of which comprises a bottom portion arranged on the undersides of the casing and the end caps and an end portion formed integral with the bottom portion and secured to the outer end surface of the end cap. The first and second under seal members thus formed are engaged together. A first bottom portion of the first under seal member and a second bottom portion of the second under seal member have their end surfaces formed with engagement recesses. A first end portion of the first under seal member and a second end portion of the second under seal member have their end surfaces formed with engagement projections. Then, the end of the first bottom portion and the second end portion are engaged in such a way that their longitudinal overall length can be adjusted. At the same time, the first end portion and the end of the second bottom portion are engaged in such a way that their longitudinal overall length can be adjusted.

Because the pair of L-shaped under seal members are engaged so as to be longitudinally movable relative to each other, dimensional errors of the longitudinal overall length of the casing and the end caps can be offset by adjusting the length of the under seal. In addition, if the under seal is elongated or contracted due to thermal expansion, external forces and lubricant-caused bulging, the deformation is offset by the engagement portion, so that the under seal is free from excess forces and prevented from bending-caused degrading in sealing performance.

The end portions of the under seal facing the end surfaces of the end caps are secured to the end surfaces of the end caps or casing by screws, so that there is no need to fix the under seal to the underside of the casing or end caps. As a result, even if the distance H or dimension $H_1$ between the base on which the track rail is installed and the slider's underside is very small, the under seal can be firmly secured by fastening means such as screws. Compared with the conventional under seal that is mounted to the slider by bonding agent, the under seal of this invention can be firmly and reliably secured to the slider. The linear rolling guide unit of this invention, therefore, can provide an under seal suited for miniature linear ways.

The sealing device applied to the linear rolling guide unit of this invention comprises three components—an under seal and two end seals—or two L-shaped under seal members. Compared with the conventional sealing device made up of four components, the sealing device of this invention with fewer components ensures easy assembly onto the slider. Further, because the sealing device of this invention can be fabricated with higher precision than is possible with the conventional sealing device in which the under seal and the end seals are integrally formed, the sealing performance as well as freedom of design can be improved.

DETAILED DESCRIPTION OF EMBODIMENTS

Figure 10:
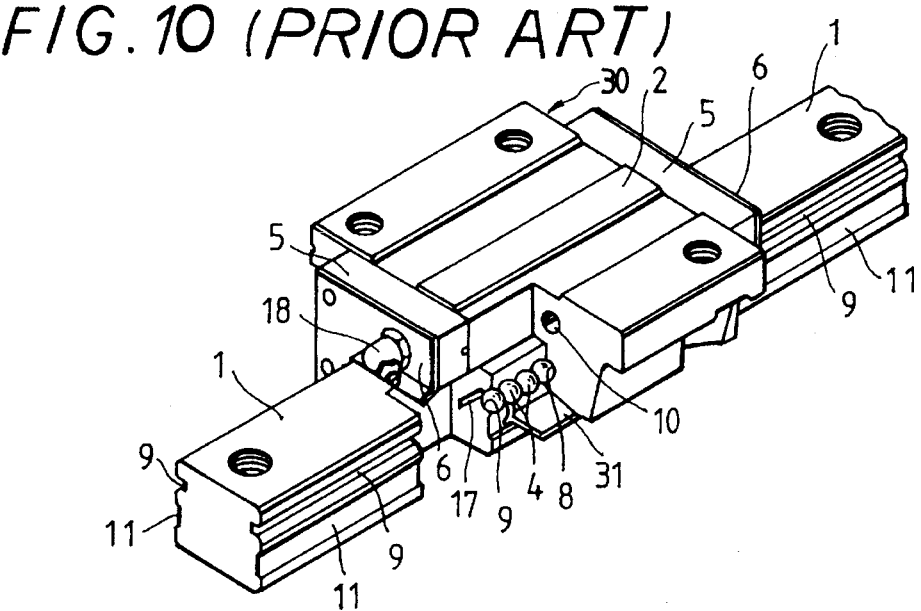
FIG. 10 is a perspective view showing one example of the conventional linear rolling guide unit.

Now, by referring to the accompanying drawings, embodiments of the linear rolling guide unit according to this invention will be described. The linear rolling guide unit of this invention has basically the same construction as that shown in FIG. 10, except for the structure of the under seal. This embodiment is characterized in that the under seal is mounted to the outer end surfaces of the end caps. The linear rolling guide unit will be explained by referring to the unit shown in FIG. 10.

Figure 1:
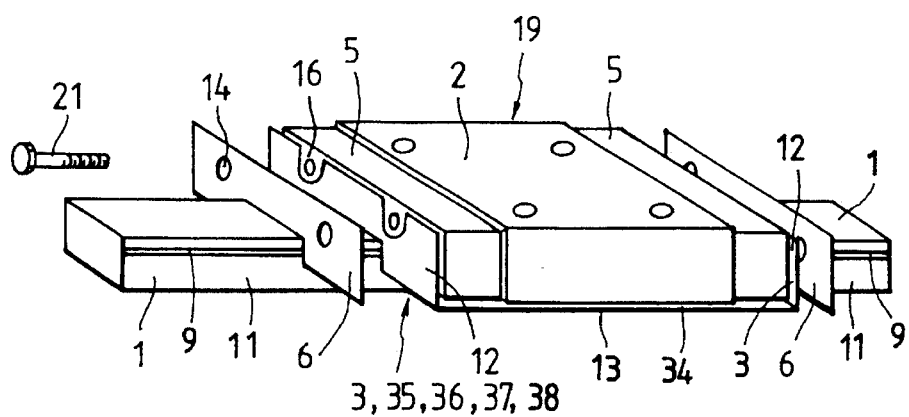
FIG. 1 is a perspective view of one embodiment of the linear rolling guide unit according to this invention.

The linear rolling guide unit of this invention, as shown in FIG. 1, comprises a track rail 1 having raceway grooves 9 (first raceway grooves) extending longitudinally on both side wall surfaces 11 thereof; and a slider 19 mounted astride the track rail 1 in such a way as to be movable relative to it. The slider 19 includes: a casing 2 slidable relative to the track rail 1 and having raceway grooves 8 (second raceway grooves) formed at positions opposing the first raceway grooves 9 (FIG. 10); a number of rolling elements 4 rolling between the opposing raceway grooves 8 and 9 to allow their relative motion (FIG. 10); end caps 5 attached to the longitudinal ends of the casing 2; end seals 6 arranged on that side of each end caps 5 opposite to the casing; and an under seal 3 arranged on the undersides of the casing 2 and the end caps 5.

The slider 19 is mounted astride the track rail 1 and can freely slide on it through the rolling elements 4, a number of balls, that roll along the raceway grooves 9 in the track rail 1. That is, the rolling elements 4 that travel loaded along the raceway grooves 9 of the track rail 1 are led to direction changing passages (not shown) formed in the end caps 5 and further to return passages 10 (FIG. 10) formed in the upper part of the casing 2 parallel to the raceway grooves 8. Thus, the rolling elements 4 run endlessly through endless circulating passages. In this way, the slider 19 is allowed to slide relative to the track rail 1 by the rolling elements 4 traveling loaded between the raceway grooves 8 on the slider 19 and the raceway grooves 9 on the track rail 1.

Figure 2:
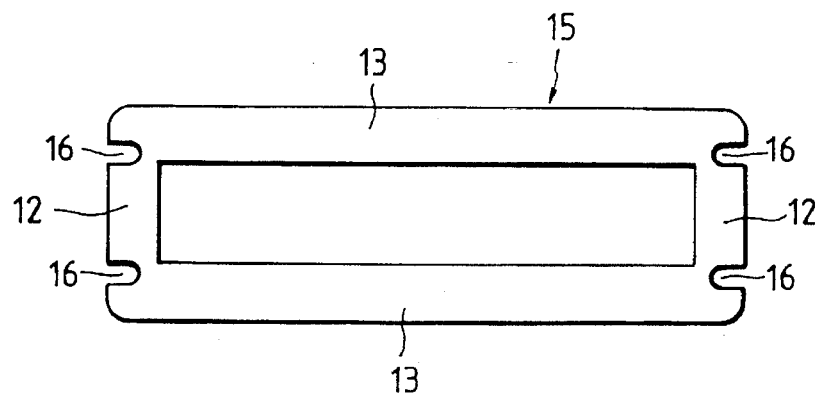
FIG. 2 is a plan view showing the process of making the under seal built into the linear rolling guide unit of FIG. 1.
Figure 3:
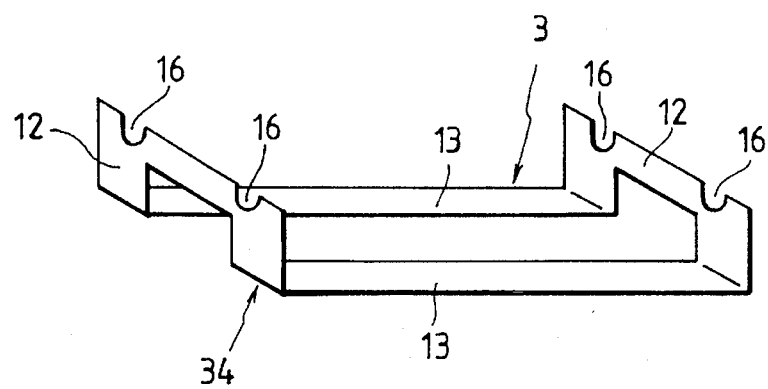
FIG. 3 is a perspective view showing one embodiment of the under seal built into the linear rolling guide unit of FIG. 1.

The under seal 3 provides vertical sealing for the track rail 1, the casing 2 and the end caps 5. The under seal 3 is manufactured by the process shown in FIGS. 2 and 3. First, a steel plate about 0.3 mm thick is punched out to form a rectangular ring member 15, as shown in FIG. 2. The rectangular ring member 15 has a pair of parallel end portions 12, 12 and a pair of parallel bottom portions 13, 13. The end portions 12, 12 are each formed with two U-shaped notches 16, 16. By bending the end portions 12, 12 from the bottom portions 13, 13, a core member 34 is formed that constitutes the under seal 3 which is U-shaped in a longitudinal cross section, as shown in FIG. 3. The material of the under seal 3 may be a metal other than steel. That is, the under seal 3 of this linear rolling guide unit of this embodiment uses the core member 34 itself as the under seal and functions as a labyrinth seal.

Figure 4:
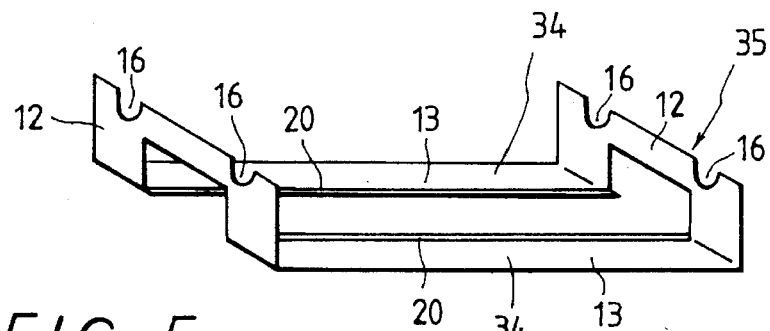
FIG. 4 is a perspective view showing another embodiment of the under seal built into the linear rolling guide unit of FIG. 1.

Next, another embodiment of the linear rolling guide unit is explained by referring to FIG. 4 as well as FIGS. 1 to 3.

Figure 11:
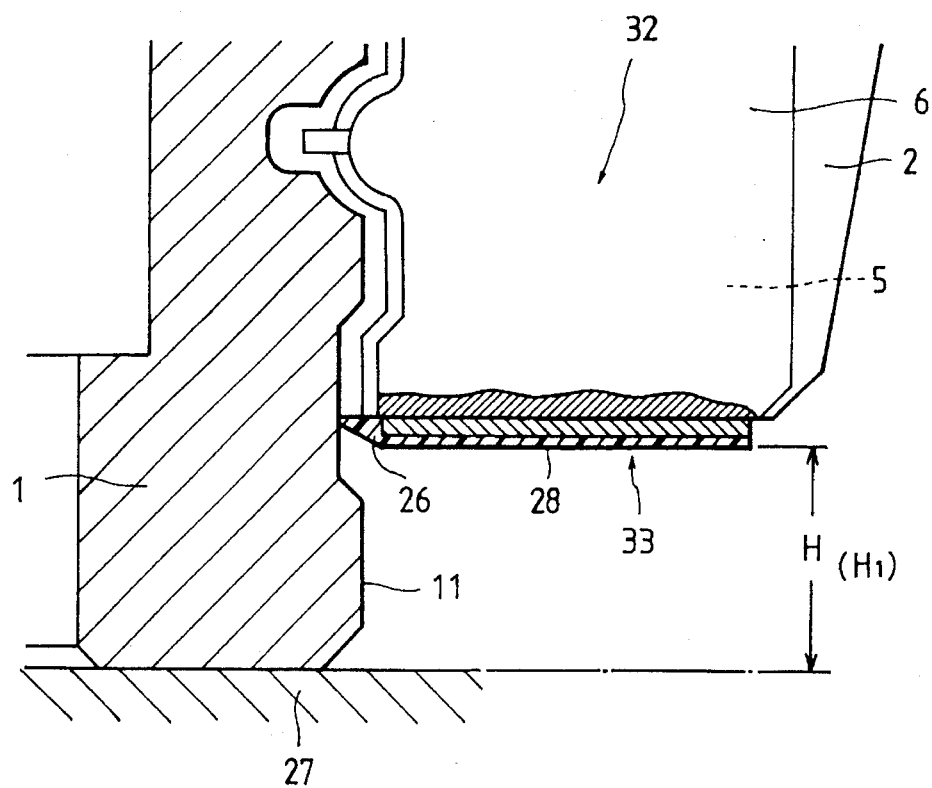
FIG. 11 is an end view of another example of the conventional linear rolling guide unit.
Figure 12:
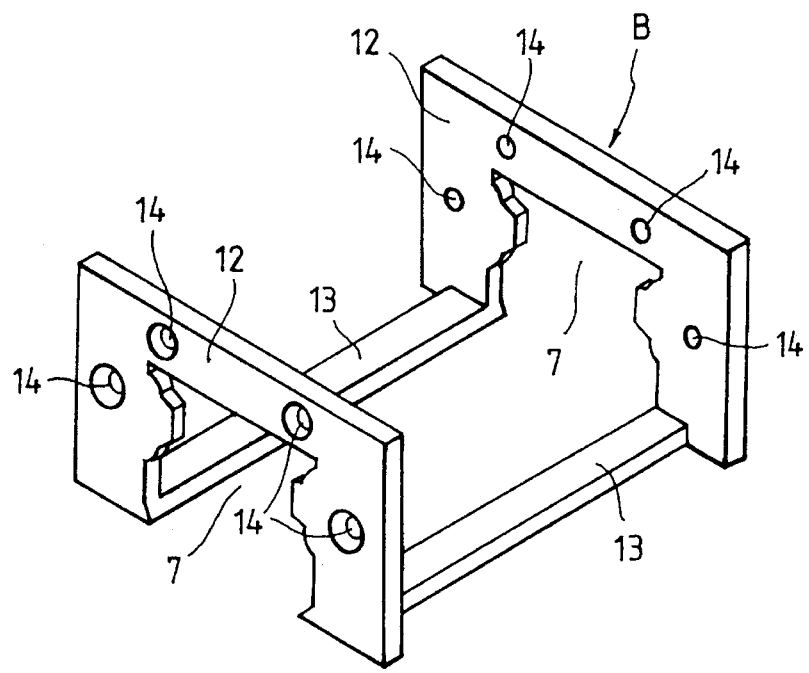
FIG. 12 is a perspective view showing one example of a sealing device built into the conventional linear rolling guide unit.

The under seal 35 shown in FIG. 4 is formed by fixing a seal member 20 of such elastic material as oil resistant rubber and plastics to the core member 34 of FIG. 3 by baking. The seal member 20 has a lip portion that forms a seal which contacts the side wall surface 11 of the track rail 1 to seal a gap between the slider 19 and the track rail 1. The lip portion may have a shape similar to that designated by reference numeral 26 in FIG. 11.

The process of mounting the under seal 3, 35 onto the slider 19 is as follows. In FIG. 1, the end seals 6 are attached to the end portions 12, 12 of the under seal 3, 35; screws 21 are inserted through the mounting holes 14 in the end seals 6 and the U-shaped notches 16 of the end portions 12, 12 to fasten the under seal 3, 35 and the end seals 6 to the end cap 5 or casing 2. Hence, even when the distance H or dimension $H_1$ between the base on which the track rail 1 is mounted and the underside of the slider 19 is very small, the under seal 3 can be fastened by screws 21 to the casing 2 or end caps 5 together with the end seals 6. In mounting the under seal 3, 35 and the end seals 6 to the end caps 5 or casing 2, fixing screws that are used for fastening the end caps 5 to the casing 2 may be used. Or separate screws may be used. Because the under seal 3, 35 of this embodiment is formed separate from the end seals 6, they can be manufactured with high precision improving the sealing performance. At the same time, when the under seal 3, 35 or end seals 6 are damaged, only the damaged parts need be replaced, keeping the repair cost at resonable level.

Figure 5:
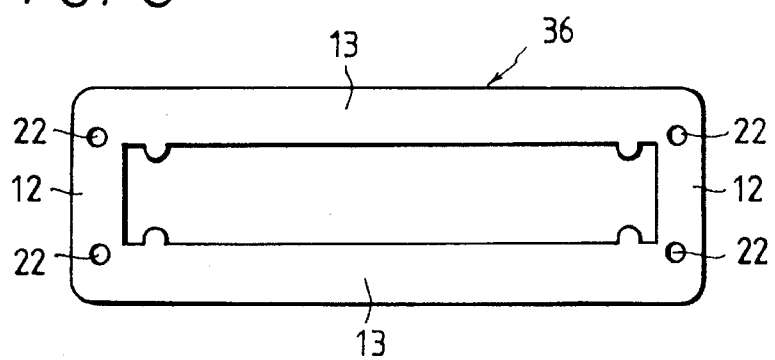
FIG. 5 is a plan view showing still another embodiment of the under seal built into the linear rolling guide unit of FIG. 1.

By referring to FIG. 5 still another embodiment of the under seal built into the linear rolling guide unit is described.

The under seal 36 shown in FIG. 5 has a rectangular ring shape consisting of a pair of end portions 12, 12 and a pair of bottom portions 13, 13 and is made from an elastic material such as oil resistant rubber and plastics. The under seal 36 is therefore bendable. The end portions 12, 12 are each formed with two holes 22, 22 through which to insert screws 21. Mounting the under seal 36 to the slider 19 involves the steps of holding the under seal 36 against the slider 19, bending it, and fastening the under seal 36 along with the end seals 6 to the end caps 5 or casing 2 with screws 21. In attaching the under seal 36 and the end seals 6 to the end caps 5 or casing 2, fixing screws that are used to fasten the end caps 5 to the casing 2 may be used, or separate dedicated screws may be used. When the under seal 36 is formed of resilient material such as oil resistant rubber and plastics, the under seal 36 itself is flexible and thus can offset dimensional errors in the longitudinal overall length of the slider 19.

This embodiment concerns a sealing device that uses the under seal 36 and the end seals 6 in combination. The use of the end seals 6 may be omitted by machining the end portions 12 of the under seal 36 with high precision. In that case, because the under seal 36 that also serves as the end seals is made from oil resistant rubber, it can offset the dimensional error of the longitudinal overall length of the slider 19.

Figure 6:
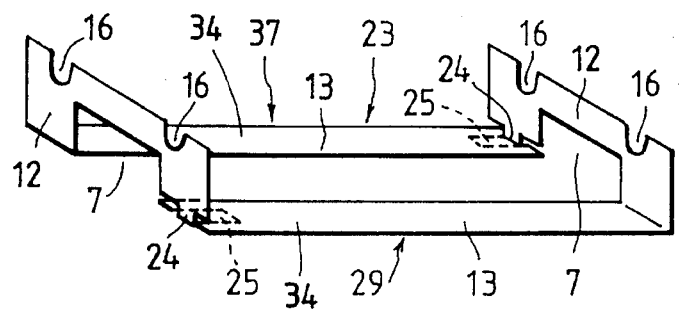
FIG. 6 is a perspective view showing a further embodiment of the under seal built into the linear rolling guide unit according to this invention.
Figure 7:
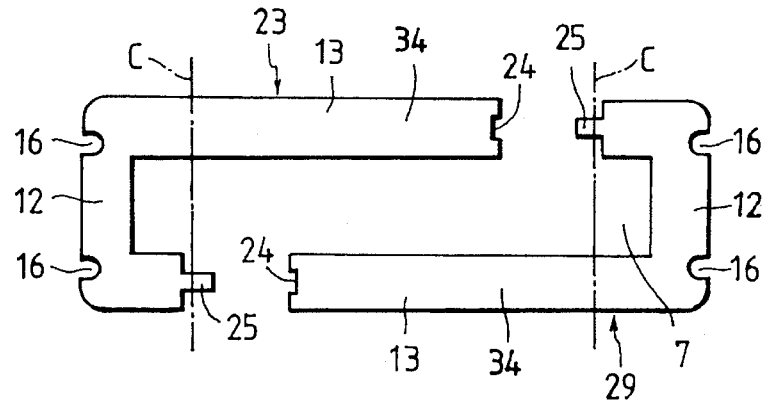
FIG. 7 is a disassembled view of the under seal of FIG. 6.

Next, by referring to FIGS. 6 and 7, another embodiment of the linear rolling guide unit according to this invention is described.

The method of manufacture of the under seal 37 of this embodiment is explained. As shown in FIG. 7, a steel plate about 0.3 mm thick is punched out in a shape of letter L to make a pair of L-shaped under seal members 23, 29. The under seal members 23, 29 each consists of a gate-like end portion 12 having an opening 7 and a longitudinally extending bottom portion 13. These two under seal members 23, 29 have identical shapes. The bottom portion 13 extends vertically from one end of the end portion 12, and the front end portion of the bottom portion 13 is formed with an engagement recess 24. The other end of the end portion 12 is formed with a tongue-shaped engagement projection 25 that engages with the engagement recess 24 of the bottom portion 13 of the other L-shaped under seal member. The end portion 12 is also formed with U-shaped notches 16 through which to insert screws 21. The mating under seal members 23 and 29 are coupled together, with the engagement recesses 24 and the engagement projections 25 connected, to form the under seal 37. The bottom portions 13 of the under seal members 23, 29 are arranged at the undersides of the casing 2 and the end caps 5 on both sides of the track rail 1. The end portions 12 of the under seal members 23, 29 are formed integral with the end of the bottom portions 13 and fixed to the outer end surfaces of the end caps 5.

The pair of L-shaped under seal members 23, 29 are made from punched metal material and thus it is possible to form a variety of shapes of under seals and save the metal plate material by making appropriate arrangement of the metal plate when punching it. For example, the bottom portions 13, 13 of two L-shaped under seal members 23, 29 may be arranged side by side for punching so that the front end of each bottom portion 13 is positioned at the end of the end portion 12 of the other L-shaped under seal member 23, 29. This results in a significant saving of the material.

The punched, L-shaped under seal members 23, 29 are bent at right angles at positions indicated by one-dot chain line C in FIG. 7 to shape the under seal 37 as shown in FIG. 6. The bending position of the engagement projection 25 of the end portion 12 is slightly shifted from the bending position of the bottom portion 13, allowing for the thickness of the steel plate. That is, in order that the heights of the two bottom portions 13, 13 are equal in the assembled state of FIG. 6, the bending position of the engagement projection 25 of the end portion 12 and the bending position of the bottom portion 13 are deviated from each other by an amount equal to the thickness of the steel plate. Because the tongue-shaped engagement projection 25 is bent, not at the base, but at a position deviated by the thickness of the steel plate, when the engagement projection 25 is engaged in the engagement recess 24, the pair of L-shaped under seal members 23, 29 can be automatically positioned and be adjusted in the longitudinal direction. In this way, the pair of under seal members 23, 29 are engaged in such a way as to be movable relative to each other in the longitudinal direction. Hence, if there is dimensional errors in the slider 19, the overall length of the under seal can be adjusted. Further, if the under seal is subjected to thermal expansion, lubricant-caused bulging or external forces, it is simply extended or contracted and thus not stressed by excess forces. In this embodiment, therefore, the under seal 37 when assembled into the slider 19 ensures good sealing. The under seal 37 of this embodiment, if used as it is, functions as a labyrinth seal.

The mounting of the under seal 37 of this embodiment onto the slider 19 is performed as follows. The tongue-shaped engagement projection 25 and the engagement recess 24 are engaged to combine the pair of L-shaped under seal members 23, 29 into the under seal 37 of FIG. 6. The assembled under seal 37 is attached with the end seals 6, and screws 21 are passed through the mounting holes 14 of the end seals 6 and the U-shaped notches 16 of the under seal 37 to fasten the end seals 6 and the under seal 37 to the end surfaces of the end caps 5 or casing 2. In this way, the under seal 37 is mounted to the end surfaces of the end caps 5 or casing 2 without fixing the under seal 37 to the bottom of the slider 19, so that even when the distance H (dimension $H_1$) between the base on which the track rail 1 is installed and the underside of the slider 19 is very small, the under seal 37 can be firmly and easily fixed by screws 21. In fastening the under seal 37 and the end seals 6 to the end caps 5 or casing 2, the fixing screws that are used to fix the end caps 5 to the casing 2 may be used, or dedicated screws may be used.

Figure 8:
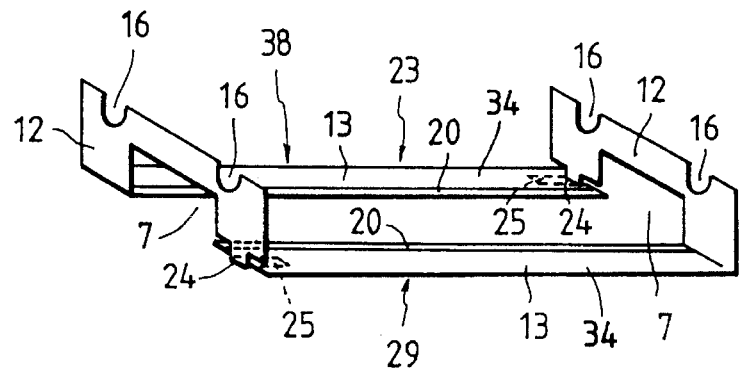
FIG. 8 is a perspective view showing a further embodiment of the under seal built into the linear rolling guide unit according to this invention.
Figure 9:
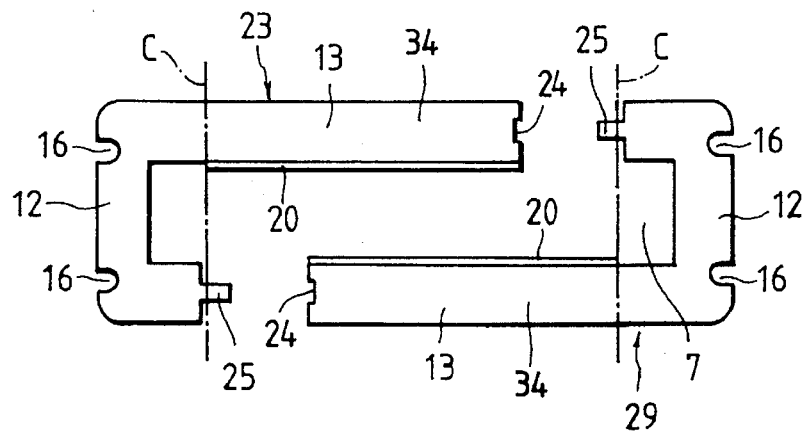
FIG. 9 is a disassembled view of the under seal of FIG. 8.

Next, by referring to FIGS. 8 and 9, a further embodiment of the linear rolling guide unit according to this invention will be described.

The under seal 38 of this embodiment differs from the under seal 37 of FIG. 6 only in the following respect. That is, the under seal 38 uses the under seal 37 (see FIG. 6) as the core member 34 (see FIG. 4) and, as shown in FIG. 4, a seal member 20 of such elastic material as oil resistant rubber is fixed to the core member 34 by baking. The under seal 38 of this embodiment has the seal function of the under seal 35 shown in FIG. 4 as well as the seal function of the under seal 37 shown in FIG. 6.

The linear rolling guide unit with the construction as described in the preceding embodiments can have the under seal 3, 35, 36, 37, 38 mounted to the end caps 5 or casing 2 by using other fastening means such as rivets and bolts.

What is claimed is:

1. A linear rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to the longitudinal ends of the casing;
   rolling elements circulating between the opposing first and second raceway grooves;
   end seals attached to outer end surfaces of the end caps;
   an under seal arranged on the undersides of the casing and the end caps on both sides of the track rail, the under seal being adapted to seal between the casing and the track rail and between the end caps and the track rail;
   wherein the under seal comprises a pair of bottom portions arranged on the undersides of the casing and the end caps on both sides of the track rail, and a pair of facing end portions bent integrally from the ends of the bottom portions and fixed to the outer end surfaces of the end caps.

2. A linear rolling guide unit according to claim 1, wherein the under seal is made from a metal material.

3. A linear rolling guide unit according to claim 1, wherein the under seal comprises a core member made from a metal material that forms the bottom portions and the end portions, and a seal member of an elastic material secured to that part of the bottom portions of the core member on the track rail side.

4. A linear rolling guide unit according to claim 1, wherein the under seal is made from an elastic material of either oil resistant rubber or plastics.

5. A linear rolling guide unit according to claim 1, wherein the under seal comprises a first under seal member and a second under seal member engaged with the first under seal member, and the first end surfaces of the first under seal member and the second end surfaces of the second under seal member are formed in such a way that the first end surfaces can be in contact and engaged with the second end surfaces.

6. A linear rolling guide unit according to claim 5, wherein the first under seal member comprises a first bottom portion arranged on the undersides of the casing and the end caps on one side of the track rail and a first end portion bent integrally from an end of the first bottom portion and secured to an outer end surface of one of the end caps, and the second under seal member comprises a second bottom portion arranged on the undersides of the casing and the end caps on the other side of the track rail and a second end portion bent integrally from an end of the second bottom portion and secured to an outer end surface of the other end cap.

7. A linear rolling guide unit according to claim 6, wherein the first bottom portion of the first under seal member and the second bottom portion of the second under seal member have their end surfaces formed with engagement recesses, and the first end portion of the first under seal member and the second end portion of the second under seal member have their end surfaces formed with engagement projections engaged in the engagement recesses.

* * * * *